US012167386B2

(12) United States Patent
Chin et al.

(10) Patent No.: US 12,167,386 B2
(45) Date of Patent: Dec. 10, 2024

(54) METHOD FOR ALLOWING A USER EQUIPMENT (UE) TO RESPOND CELLULAR NETWORK SIGNALING OVER A NON-CELLULAR RADIO ACCESS NETWORK

(71) Applicant: GUANGDONG OPPO MOBILE TELECOMMUNICATIONS CORP., LTD., Dongguan (CN)

(72) Inventors: Chenho Chin, Dongguan (CN); Haorui Yang, Dongguan (CN); Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 359 days.

(21) Appl. No.: 17/707,855

(22) Filed: Mar. 29, 2022

(65) Prior Publication Data

US 2022/0225349 A1 Jul. 14, 2022

Related U.S. Application Data

(63) Continuation of application No. PCT/CN2019/109622, filed on Sep. 30, 2019.

(51) Int. Cl.
*H04L 12/64* (2006.01)
*H04W 52/02* (2009.01)
(Continued)

(52) U.S. Cl.
CPC ... *H04W 72/1215* (2013.01); *H04W 52/0216* (2013.01); *H04W 60/04* (2013.01); *H04W 72/23* (2023.01)

(58) Field of Classification Search
CPC . H04W 48/18; H04W 52/0216; H04W 60/04; H04W 68/12; H04W 72/1215;
(Continued)

(56) References Cited

U.S. PATENT DOCUMENTS 11,405,851 B2 * 8/2022 Talebi Fard .......... H04W 76/16
2008/0259912 A1 * 10/2008 Wang .................... H04W 68/12
370/356

(Continued)

FOREIGN PATENT DOCUMENTS

CN 105144789 A 12/2015
CN 106576234 A 4/2017
(Continued)

OTHER PUBLICATIONS

The Second Office Action dated Oct. 26, 2023 from Chinese application No. 202210503547.8.
(Continued)

*Primary Examiner* — Phuc H Tran
(74) *Attorney, Agent, or Firm* — BAYES PLLC

(57) ABSTRACT

A method for allowing a user equipment (UE) to respond cellular network signalling over a non-cellular radio access network. The UE initiates a service request procedure for a cellular network service and receives a service reject message in response. The UE enters an inactive state over a non-cellular radio access. Upon receiving an indication through cellular network signalling indicating that a set of downlink data are available for transmission to the UE, the UE responds to the indication over the non-cellular radio access by initiating another service request procedure that activates the non-cellular radio access, enters an active state of the UE over the non-cellular radio access, and receives the set of downlink data through user plane or connection of the non-cellular radio access.

19 Claims, 8 Drawing Sheets

(51) Int. Cl.
*H04W 60/04* (2009.01)
*H04W 72/12* (2023.01)
*H04W 72/23* (2023.01)

(58) Field of Classification Search
CPC ..... H04W 72/23; H04W 76/18; H04W 84/12; H04W 88/06
See application file for complete search history.

(56) References Cited

U.S. PATENT DOCUMENTS

| | | | |
|---|---|---|---|
| 2018/0279400 A1* | 9/2018 | Faccin | H04W 68/005 |
| 2019/0028961 A1 | 1/2019 | Faccin et al. | |
| 2020/0053830 A1* | 2/2020 | Venkataraman | H04W 68/12 |
| 2020/0367149 A1* | 11/2020 | Kang | H04W 28/0247 |

FOREIGN PATENT DOCUMENTS

| | | |
|---|---|---|
| CN | 114402663 A | 4/2022 |
| EP | 3151599 A1 | 4/2017 |
| WO | 2018203713 A1 | 11/2018 |

OTHER PUBLICATIONS

The Hearing Notice dated Jan. 17, 2024 from Indian patent application No. 202227024365.

The Notice of Allowance dated Jan. 18, 2024 from Chinese application No. 202210503547.8.

International Search Report and the Written Opinion Dated Jun. 29, 2020 From the International Searching Authority Re. Application No. PCT/CN2019/109622, 10 pages.

Zte et al. 23. 501 P-CR: Trigger a UE via non-3GPP access for re-activating PDU sessions in 3GPP acess SA WG2 Meeting #122, S2-174664 Jun. 26, 2017, 5 pages.

Supplementary European search report dated Aug. 30, 2022 from European Application No. 19947631.8.

First Examination report dated Sep. 7, 2022 from Indian Application No. 202227024365.

"3rd Generation Partnership Project; Technical Specification Group Services and System Aspects; Study on Access Traffic Steering, Switching and Splitting support in the 5G system architecture (Release 16)", 3GPP Standard; Technical Report; 3GPP TR 23.793, 3rd Generation Partnership PROJECT(3GPP), Mobile Competence Centre; 650, Route Des Lucioles; F-06921 Sophia-Antipolis Cedex; France, vol. SA WG2, No. v0.4.0, Apr. 30, 2018.

OPPO: "Ue in IDLE over non-3GPP access even when non-3GPP access is available", 3GPP Draft; S2-1909212-DP-ATSSS-Paging-for-Backed-Off-N3GPP, 3rd Generation Partnership Project (3GPP), Mobile Competence Centre; 650, Route Des Lucioles; F-06921 Sophia Sophia-Antipolis Cedex; France, vol. SA WG2, No. Split, Croatia; Oct. 14-Oct. 18, 2019 Oct. 3, 2019.

The First Office Action dated Jul. 1, 2023 from Chinese application No. 202210503547.8.

* cited by examiner

METHOD FOR ALLOWING A USER EQUIPMENT (UE) TO RESPOND CELLULAR NETWORK SIGNALING OVER A NON-CELLULAR RADIO ACCESS NETWORK

CROSS REFERENCE TO RELATED APPLICATIONS

The application is a continuation of International Application No. PCT/CN2019/109622, filed on Sep. 30, 2019, entitled "METHOD FOR ALLOWING A USER EQUIPMENT (UE) TO RESPOND CELLULAR NETWORK SIGNALLING OVER A NON-CELLULAR RADIO ACCESS NETWORK", the entire contents of which are incorporated herein by reference in its entirety.

BACKGROUND

The present disclosure relates to the field of communication systems, and more particularly, to an apparatus and a method for allowing a user equipment (UE) to respond cellular network signalling over a non-cellular radio access network Under the feature of access traffic steering, switching, splitting (ATSSS), Third Generation Partnership Project (3GPP) SA2 working group introduced the concept of a multi-access (MA) protocol data unit (PDU) session. The MA PDU Session, as the name suggest, means that for a session, traffic flows for that session can go on more than one access interfaces. As currently 5G system (5GS) can support 3GPP and non-3GPP access networks, the data for a MA PDU Session can flow uplink (UL) or downlink (DL) through these two access networks.

Improved use of the ATSSS feature is desired.

SUMMARY

An object of the present disclosure is to propose an apparatus and a method for allowing a user equipment (UE) to respond cellular network signalling over a non-cellular radio access network.

In a first aspect of the present disclosure, a method for allowing a user equipment (UE) to respond cellular network signalling over a non-cellular radio access network includes the following steps: initiating a service request procedure over non-cellular radio access for a cellular network service; receiving a service reject message in response to the service request procedure; entering an inactive state of the UE over a non-cellular radio access; receiving an indication through cellular network signalling indicating that a set of downlink data for the non-cellular radio access are available for transmission to the UE; responding to the indication over the non-cellular radio access by initiating another service request procedure that activates the non-cellular radio access; entering an active state of the UE over the non-cellular radio access upon activation of the non-cellular radio access which includes a connection and user plane; and receiving the set of downlink data through the user plane of the non-cellular radio access in the active state of the UE.

In a second aspect of the present disclosure, a method for allowing a user equipment (UE) to respond cellular network signalling over a non-cellular radio access network includes the following steps: receiving an indication through cellular network signalling indicating that a set of downlink data for the non-cellular radio access are available for transmission to the UE during an inactive state of the UE over a non-cellular radio access; responding to the indication over the non-cellular radio access by initiating a service request procedure that activates the non-cellular radio access; entering an active state of the UE over the non-cellular radio access upon activation of the non-cellular radio access which includes a connection and user plane; and receiving the set of downlink data through the user plane of the non-cellular radio access in the active state of the UE.

In a third aspect of the present disclosure, a method for allowing a user equipment (UE) to respond cellular network signalling over a non-cellular radio access network includes the following steps: initiating a service request procedure over non-cellular access for a cellular network service; receiving a service reject message in response to the service request procedure; keeping an active state of the UE over a non-cellular radio access after receiving the service reject message; receiving an indication through cellular network signalling indicating that a set of downlink data for the non-cellular radio access are available for transmission to the UE during the active state of the UE over a non-cellular radio access; reactivating the user plane over non-cellular access if that is not active; and receiving the set of downlink data through the user plane of the non-cellular radio access in the active state of the UE in response to the indication.

The disclosed method according to embodiments of the present disclosure may be implemented in an apparatus including a transceiver and a processor. The transceiver is configured to transmit and receive signaling. The processor connected to the transceiver is configured to execute the steps in the disclosed method.

According to a fourth aspect of the present disclosure there is provided a non-transitory computer readable medium having computer readable instructions stored thereon for execution by a processor to perform the method of another aspect of the present disclosure.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Fifth-generation (5G) wireless systems are generally a cellular communication system in a frequency range 2 (FR2) ranging from 24.25 GHz to 52.6 GHz, where multiplex transmit (Tx) and receive (Rx) beams are employed by a base station (BS) and/or a user equipment (UE) to combat a large path loss in a high frequency band. Due to the hardware limitation and cost, the BS and the UE might only be equipped with a limited number of transmission and reception units (TXRUs), of which some are for 3GPP access, and some are for non-3GPP access.

Figure 1:
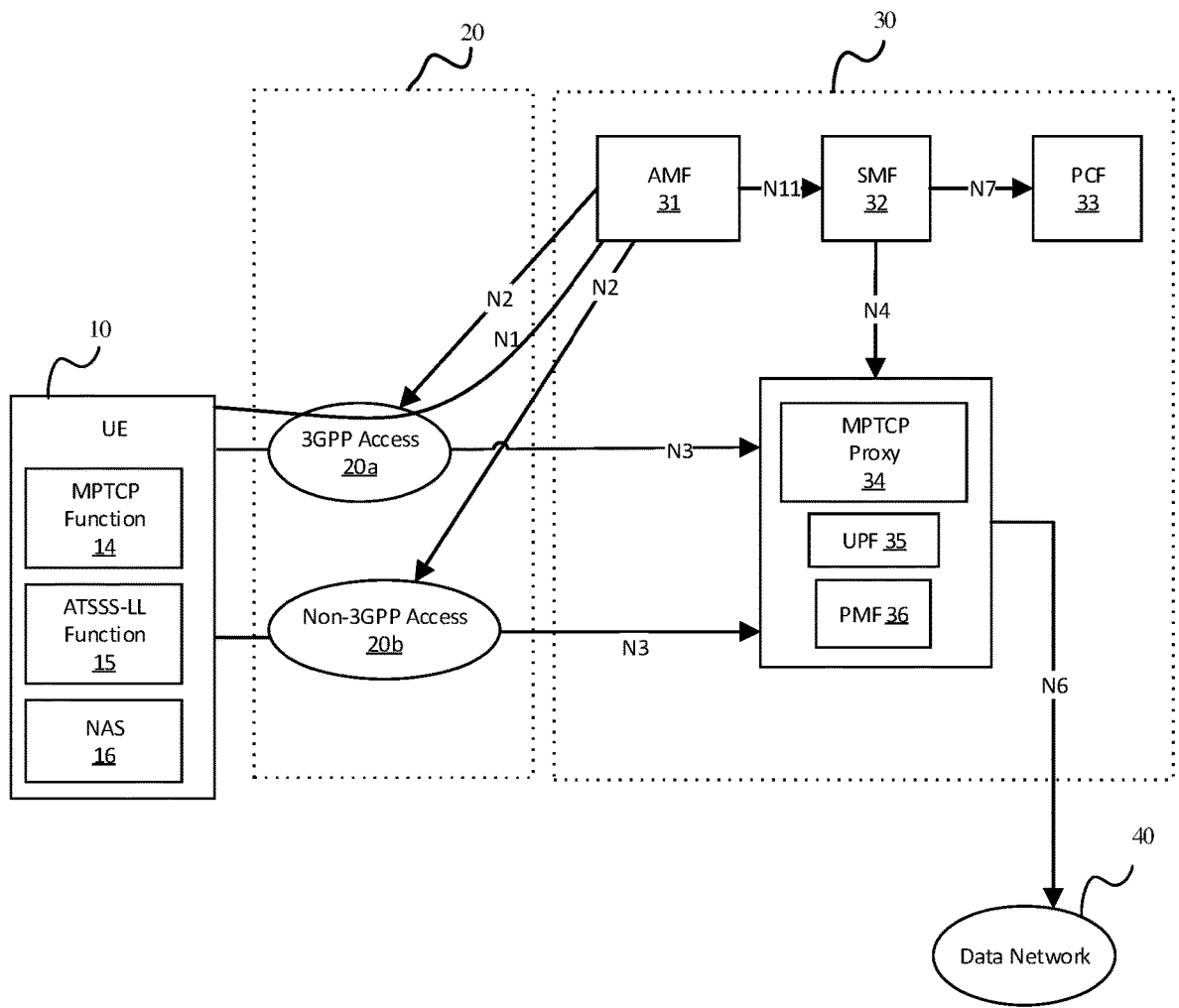
FIG. 1 illustrates a telecommunication system with an ATSSS feature.

FIG. 1 shows an architectural illustration a telecommunication system with an ATSSS feature. A UE device 10 connects to access and a mobility management function (AMF) 31 in core network 30 through 3GPP access 20a and non-3GPP access 20b in a radio access network (RAN) 20, and further connects to a data network 40, such as the Internet. Interfaces between two network entities are reference points which are formally defined in 3GPP technical specification (TS) 23.501. Reference points N1, N2, N3, N4, N6, N7, and N11 shown as lines in FIG. 1 are detailed in the following:

N1: Reference point between the UE 10 and the AMF 31.
N2: Reference point between the RAN 20 and the AMF 31.
N3: Reference point between the RAN 20 and a user plane function (UPF) 35.
N4: Reference point between a session management function (SMF) 32 and the UPF 35.
N6: Reference point between the UPF 35 and the data network (DN) 40.
N7: Reference point between the SMF 32 and a policy control function (PCF) 33.
N11: Reference point between AMF 31 and SMF 32.

The core network 30 may be a PLMN or a network slice instance of the PLMN. The network 30 further includes a performance measurement function (PMF) 36, a multipath-transmission control protocol (MPTCP) proxy 34. The UE 10 includes a MPTCP function 14, an ATSSS-lower layer (ATSSS-LL) function 15, and a non-access stratum (NAS) 16. The 3GPP access 20a may include one or more 3GPP radio access base stations. The non-3GPP access 20b may include one or more hotspot devices of non-3GPP radio access technologies.

Figure 2:
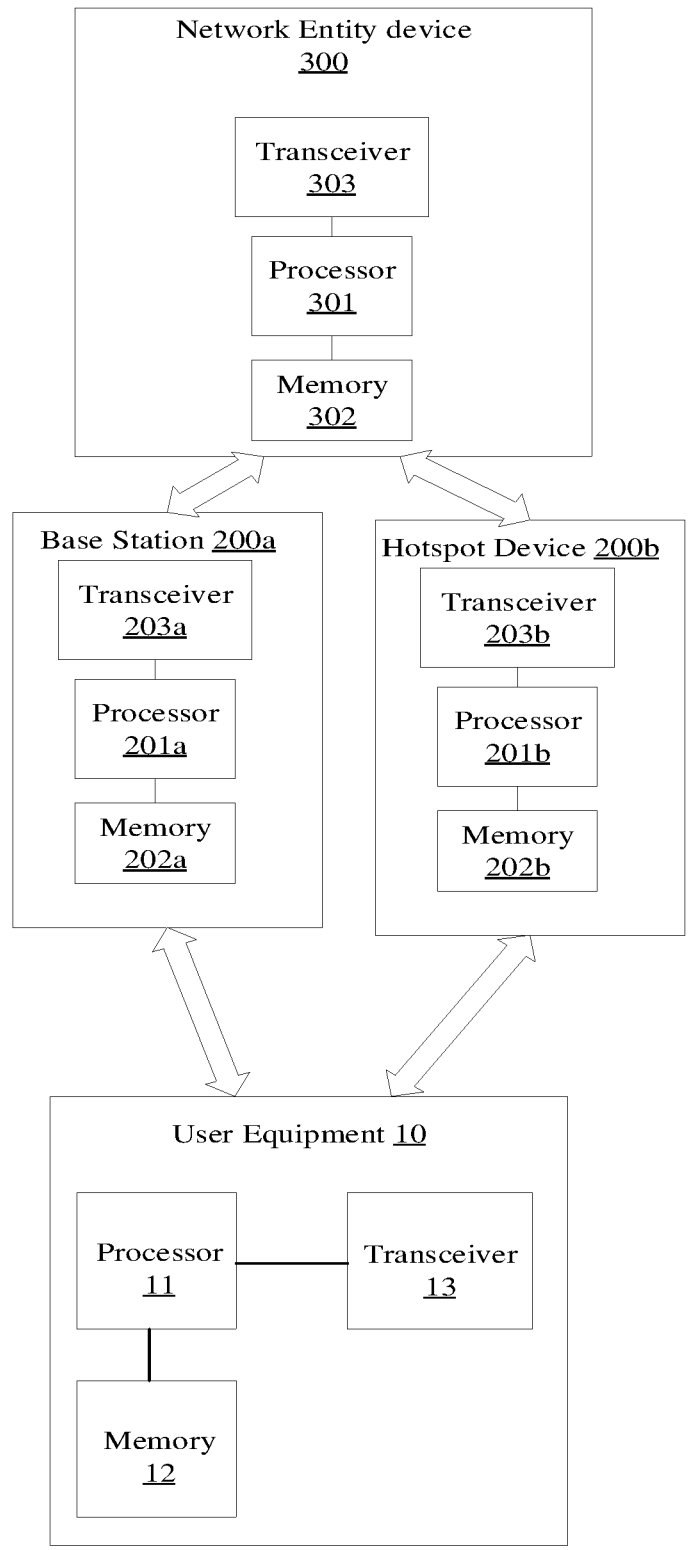
FIG. 2 is a block diagram of a user equipment (UE), a base station, a hotspot device, and a network entity device according to an embodiment of the present disclosure.

FIG. 2 illustrates that, in some embodiments, a UE 10, a base station 200a, a hotspot device 200b, and a network entity device 300 executing a method for allowing a UE to respond cellular network signalling over a non-cellular radio access network according to an embodiment of the present disclosure are provided. Connections between devices and device components are shown as lines and arrows in the FIG. 3. The UE 10 may include a processor 11, a memory 12, and a transceiver 13. The base station 200a may include a processor 201a, a memory 202a, and a transceiver 203a. The hotspot device 200b may include a processor 201b, a memory 202b, and a transceiver 203b. The network entity device 300 may include a processor 301, a memory 302, and a transceiver 303. Each of the processors 11, 201a, 201b, and 301 may be configured to implement proposed functions, procedures and/or methods described in this description. Layers of radio interface protocol may be implemented in the processors 11, 201a, 201b, and 301. Each of the memory 12, 202a, 202b, and 302 is operatively stores a variety of program and information to operate a connected processor. Each of the transceiver 13, 203a, 203b, and 303 is operatively coupled with a connected processor, transmits and/or receives a radio signal.

The 3GPP access 20a may include one or more base stations 200a. The non-3GPP access 20b may include one or more hotspot devices 200b. Each of the network entities, such as AMF 31, SMF 32, PCF 33, MPTCP proxy 34, UPF 35, and PMF 36, in network 30 or any combination of the network entities can be implemented in one or more instances of the network entity device 300.

Each of the processor 111, 201a, 201b, and 301 may include an application-specific integrated circuit (ASIC), other chipsets, logic circuit and/or data processing devices. Each of the memory 12, 202a, 202b, and 302 may include a read-only memory (ROM), a random access memory (RAM), a flash memory, a memory card, a storage medium and/or other storage devices. Each of the transceiver 13, 203a, 203b, and 303 may include baseband circuitry to process radio frequency signals.

When the embodiments are implemented in software, the techniques described herein can be implemented with modules (e.g., procedures, functions, and so on) that perform the functions described herein. The modules can be stored in a memory and executed by the processors. The memory can be implemented within a processor or external to the processor, in which those can be communicatively coupled to the processor via various means are known in the art.

The choice of which access network certain traffic flows or quality of service (QoS) flows go through is guided by available policy called ATSSS rules. ATSSS rule for each MA PDU Session is made available to UE side for UL traffic and/or QoS flows and the network (NW) side for DL traffic and/or QoS flows.

Data traffic, like all DL data traffic for the UE and UL for the network, required the availability of user plane resources, also known as dedicated radio bearers (DRBs). When a MA PDU Session is established, user plane resources can likewise be allocated or at least some of these user plane resources are allocated at that establishment time, and the rest can be allocated on a demand basis. Alternatively, once the MA PDU Session is established and user plane resources are allocated, after some period of time, the user plane resources are taken down or deallocated but the MA PDU Session is still maintained on both UE side and network side. Later on, when traffic has to be sent or received, the corresponding user plane resources are once again allocated.

Public land mobile network (PLMN) operators also increasingly deploy wireless local area network (WLAN) hotspots, such as WIFI hotspots, to offload traffic and thereby alleviate the loading of radio resources allocation in cellular systems. Such hotspots facilitate non-3GPP (N3PP) access by UE. Given that radio resources of such hotspots are "plentiful" and almost "cost-free", it is envisaged that when a UE, such as the UE 10, connects to the network 30, such as 5G core (5GC) network, through such N3PP access, the user plane once being setup/established is available until the hotspot is "OFF" or the UE gets out of coverage of the hotspot. Then such user plane resources over N3GPP access will be unavailable.

Thus, when connected to a hotspot, such as the hotspot device 200*b*, the UE 10 shall attempt to register to the PLMN, such as the network 30, through the N3GPP access, such as the N3GPP access 20*b*. Once the UE 10 is registered, the user plane resources are allocated and always available to the UE 10. When the UE 10 can establish a lower layer connection to the N3GPP access network 20*b*, the UE 10 shall attempt to get connected to the PLMN. Once successfully completing the attempt, the state of the UE 10 moves from IDLE to CONNECTED. When identifying that the UE is CONNECTED, the network 30 determines that user plane is available to the UE 10. When determining that UE is not CONNECTED, the network 30 determines that the UE 10 cannot access the hotspot for whatever reason.

For a MA PDU Session, each of policy rules, known as ATSSS rules, indicates association between certain traffic or QoS flows and an access network. When DL data for a UE, such as the UE 10, arrives at the network 30 with an ATSSS rule for that UE 10 indicating that kind of data or a QoS flow is allocated with 3GPP access, a network entity in the network 30, such as the UPF 35, delivers that DL data to the UE 10 through the user plane of a 3GPP access network 20*a*. If the data plane is not available for the 3GPP access 20*a*, a paging procedure is triggered to allow the UE 10 to respond over 3GPP access 20*a*, set up a connection over 3GPP access 20*a*, get the user plane resources of 3GPP access allocated for delivery of DL data. Then the DL data is delivered through the allocated user plane resources. The network 30 may include 5GC which includes UPF, SMF, AMF, unified data management (UDM), policy control function (PCF), control plane (CP)/user plane (UP) separation (CUPS), authentication server (AUSF), network slice selection function (NSSF), and the network exposure function (NEF).

In some embodiments, the processor 11 is configured to execute a method for allowing the UE 10 to respond cellular network signalling over a non-cellular radio access network includes the following steps: initiating a service request procedure over the non-cellular radio access for a cellular network service; receiving a service reject message in response to the service request procedure; entering an inactive state of the UE 10 over a non-cellular radio access; receiving an indication through cellular network signalling indicating that a set of downlink data for the non-cellular radio access are available for transmission to the UE 10; responding to the indication over the non-cellular radio access by initiating another service request procedure that activates the non-cellular radio access; entering an active state of the UE 10 over the non-cellular radio access upon activation of the non-cellular radio access which includes a connection and user plane; and receiving the set of downlink data through the user plane of the non-cellular radio access in the active state of the UE 10.

In some embodiments, the processor 11 is configured to execute a method for allowing the UE 10 to respond cellular network signalling over a non-cellular radio access network includes the following steps: receiving an indication through cellular network signalling indicating that a set of downlink data for the non-cellular radio access are available for transmission to the UE 10 during an inactive state of the UE 10 over a non-cellular radio access; responding to the indication over the non-cellular radio access by initiating a service request procedure that activates the non-cellular radio access; entering an active state of the UE 10 over the non-cellular radio access upon activation of the non-cellular radio access which includes a connection and user plane; and receiving the set of downlink data through the user plane of the non-cellular radio access in the active state of the UE 10.

In some embodiments, the cellular network signalling comprises Third Generation Partnership Project (3GPP) network signalling which is sent over a 3GPP access network. The non-cellular radio access connection comprises a non-3GPP radio access connection, such as wireless local area network (WLAN) connection.

In some embodiments, the indication comprises a paging message or a notification message.

In some embodiments, the inactive state of the UE 10 includes an IDLE non-access stratum (NAS) state. The active state of the UE 10 includes a CONNECTED NAS state. The method further comprises reactivating user plane resources of the non-cellular radio access for connection of the non-cellular radio access and the set of downlink data.

In some embodiments, an N1 NAS signalling connection of the UE 10 is released before the receiving of the indication.

In some embodiments, an N1 NAS signalling connection of the UE 10 is not released before the receiving of the indication.

In some embodiments, the method further includes: starting a backoff timer indicated by the service reject message after receiving the service reject message, wherein the backoff timer indicates a duration of time; refraining from requesting network service over the access where the service reject was received during the duration of time; and stopping the backoff timer and performing the initiating of the service request procedure that activates/reactivates the non-cellular radio access in response to receiving of the indication.

In some embodiments, the processor 11 is configured to execute a method for allowing the UE 10 to respond cellular network signalling over a non-cellular radio access network includes the following steps: initiating a service request procedure over non-cellular radio access for a cellular network service; receiving a service reject message in response to the service request procedure; keeping an active state of the UE 10 over a non-cellular radio access after receiving the service reject message; receiving an indication through cellular network signalling indicating that a set of downlink data for the non-cellular radio access are available for transmission to the UE 10 during the active state of the UE 10 over a non-cellular radio access; and receiving the set of downlink data through the user plane of the non-cellular radio access in the active state of the UE 10 in response to the indication.

In some embodiments, the method further includes: receiving a service reject message in response to an initial service request procedure initiated by the apparatus; starting a backoff timer indicated by the service reject message after receiving the service reject message, wherein the backoff timer indicates a duration of time; refraining from requesting network service over the access where the service reject was received during the duration of time; and stopping the backoff timer and performing the receiving of the set of downlink data in response to receiving of the indication.

When in the decision that DL data is to be delivered to the UE 10 over N3GPP access 20*b*, the UPF 35 will push the UL data through the user plane over N3GPP access 20*b* if that user plane is available to the UE 10, that is, if the UE 10 is CONNECTED.

However, if the UPF 35 find that the UE 10 is not connected over N3GPP access 20*b*, that is if UE 10 is IDLE over N3GPP access 20*b*, the network 30 will seek to deliver the DL data through 3GPP access 20*a* either through NOTIFICATION Procedure if UE 10 is CONNECTED over 3GPP access 20*a*, or through Paging procedure if UE 10 is IDLE over 3GPP access 20*a*. If the UE is IDLE over N3GPP access 20*b*, the network determines that N3GPP access is unavailable to the UE 10, and consequently delivers the DL data over 3GPP access 20*a* to the UE. The determination, however, is not always true. As demonstrated herewith, the UE 10 over N3GPP access 20*b* can stay in IDLE even though N3GPP access is available. Such event(s) or scenario(s) of not delivering the DL data over the intended N3GPP access breaks the ATSSS rule for that traffic or QoS flow as the 5G system loses the benefits of traffic offload to N3GPP access. What's more, how the DL data intended for N3GPP access 20*b* being delivered over 3GPP access 20*a* instead may exacerbate the stringent demands of scarce and precious radio resources of 3GPP cellular system.

Figure 3:
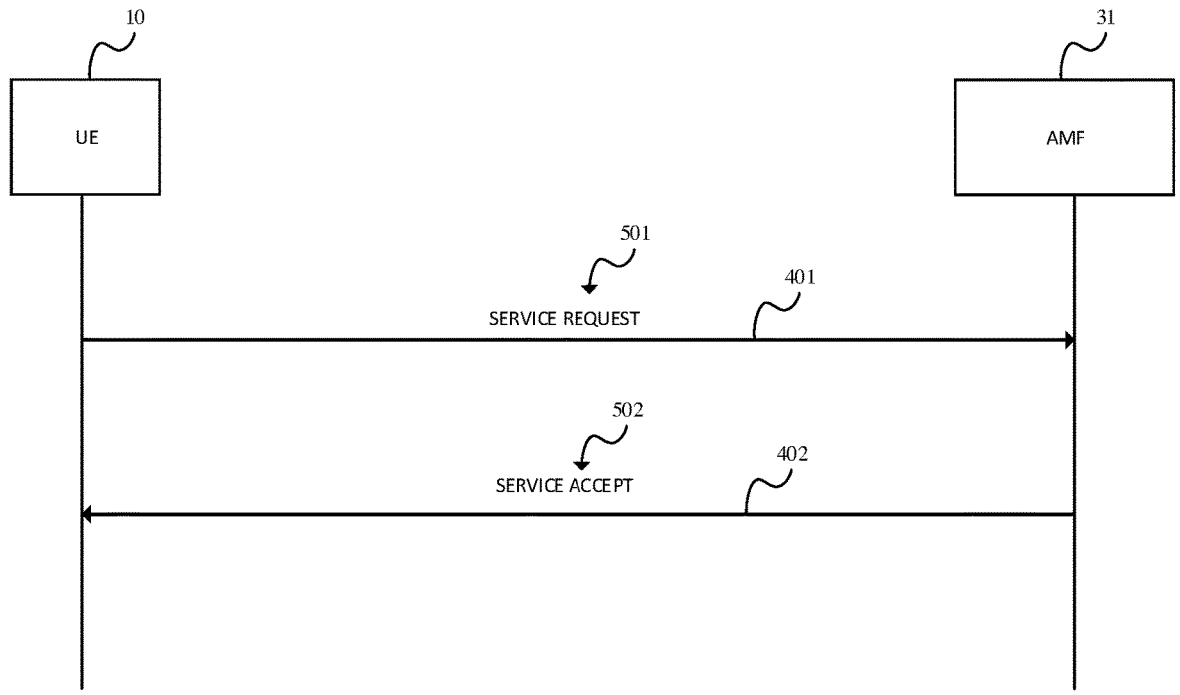
FIG. 3 illustrate a service request procedure initiated by a UE and accepted by a network.

Some scenarios that UE 10 over N3GPP access 20*b* is in IDLE while N3GPP access 20*b* is available to the UE is provided in the following:

As shown in FIG. 3, UE 10 in IDLE requests resources by performing a Service Request procedure (401), which starts with the UE 10 sending to the network a SERVICE REQUEST message 501 to the network 30, such as the AMF 31. Once accepting the request and allocates resources, the network 30, such as the AMF 31, returns to the UE a SERVICE ACCEPT 502 message (402).

Figure 4:
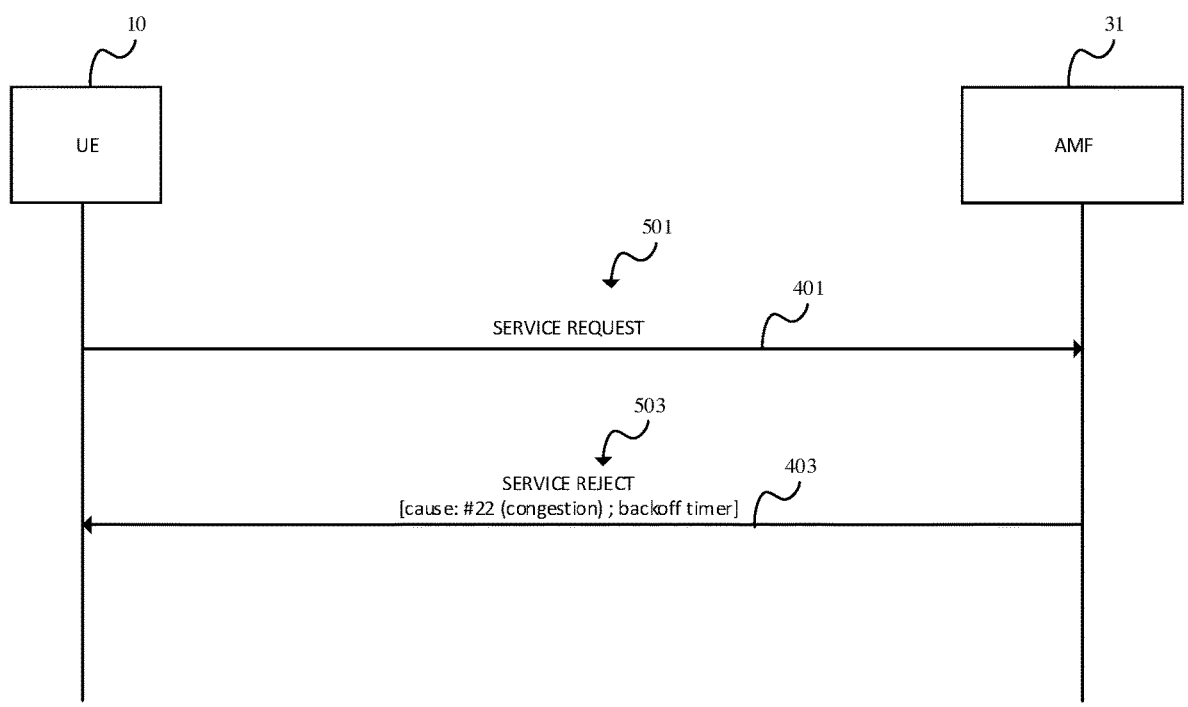
FIG. 4 illustrate a service request procedure initiated by a UE and rejected by a network.

As shown in FIG. 4, the UE 10 in IDLE sends to the network 30, such as the AMF 31, the SERVICE REQUEST message 501 to the network (401). If the network 30 is congested or determines not to provide resources to the UE 10, the network 30 can reject the request with a SERVICE REJECT message 503 and provide a reason shown as "cause #22 (congestion)" for the rejection (403). The network 30 can also provide a backoff timer that indicates a duration of time during which the UE 10 is not allowed to access or request resources from the network 30.

When the UE 10 receives the SERVICE REJECT 503 indicating that the network 30 is congested and a backoff timer is provided, the UE 10 performs or facilitates the following operations:

triggered by the network 30, releasing the N1 non-access stratum (NAS) signalling connection between the UE 10 and the network 30;
making the NAS 16 on UE side return to 5GMM_IDLE;
triggering the NAS 16 to run the backoff timer; and
keeping the NAS 16 from accessing network 30 for services until the backoff timer expires. The above steps are in compliance with TS 24.501.

Another series of events that can also lead to the scenario where the UE 10 is IDLE in N3GPP while N3GPP access is available are as follows:

UE is ON with both cellular and WIFI radio functions active, that is not in-flight mode, and with SIM(s) enabled and mobile data set "ON".
UE completes registration to PLMN via 3GPP access and also registers to PLMN via N3GPP access.
User manipulates the settings and either sets the WIFI "OFF" or modifies local configuration to turn off WIFI after detecting WIFI traffic of the UE is inactive for a period of time, such as 1 minute. For example, after detecting inactive WIFI traffic having been lasting for 1 minute, the UE 10 switches off WIFI function, and NAS in the UE 10 over N3GPP goes to IDLE.

As illustrated, many events may cause the UE 10 over N3GPP to be in IDLE while N3GPP access such as WIFI is still available.

The disclosed method allows to complete DL data delivery to the UE through N3GPP access, thus abiding to ATSSS rules for data sessions of the UE. An ATSSS rule indicates certain traffic types or/and certain QoS flows to use certain radio access.

In general, the disclosed method allows a UE, such as the UE 10, when paged or notified over 3GPP access 20*a* that DL data is to be transmitted to the UE through the N3GPP access 20*b*, to re-establish the N3GPP connection from the UE to the network, re-activate 3GPP or N3GPP user plane and complete the data delivery through N3GPP access.

Figure 5:
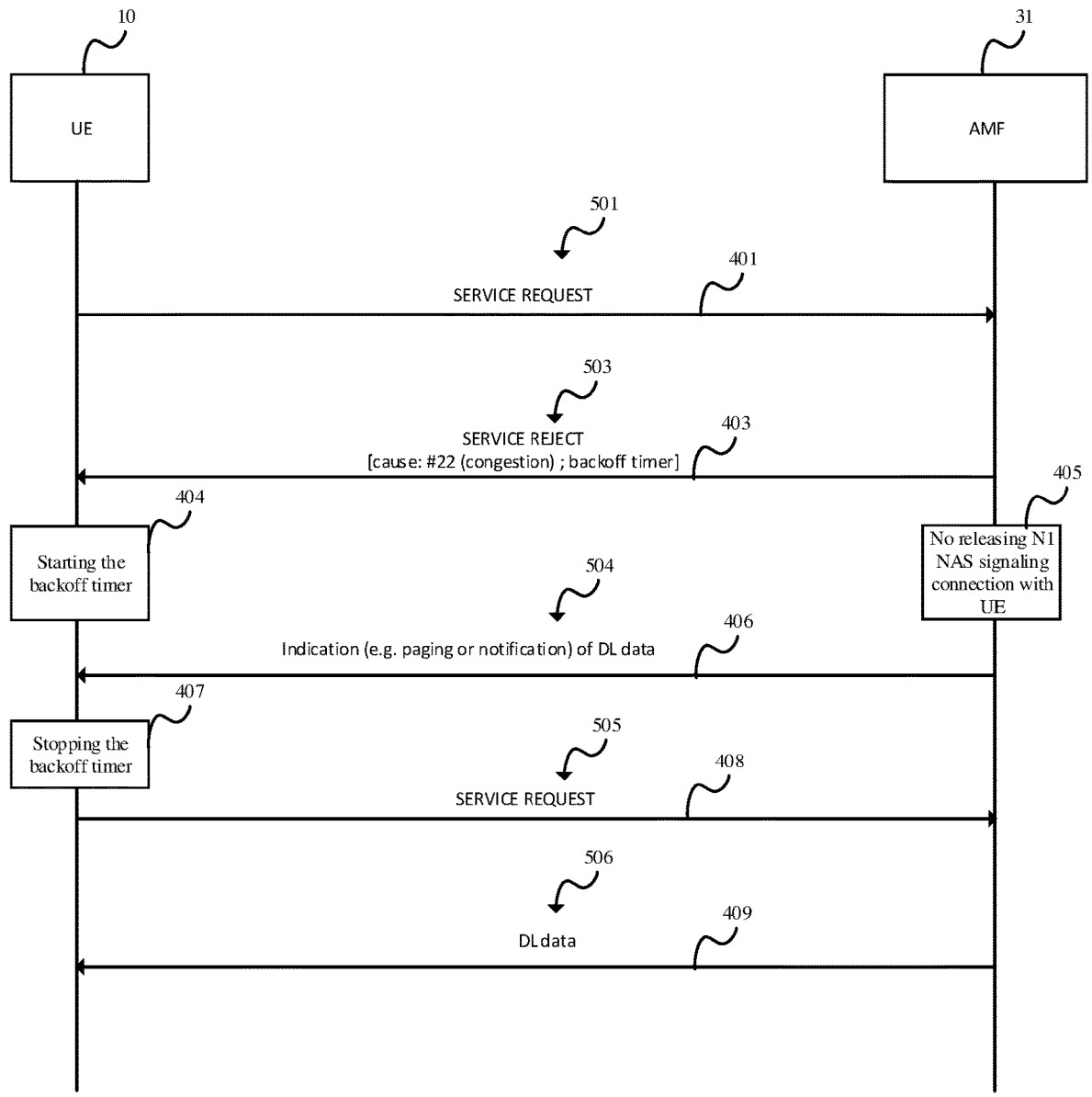
FIG. 5 illustrate a method for allowing a UE to respond cellular network signalling over a non-cellular radio access network according to an embodiment of the present disclosure.

With reference to FIG. 5, in an embodiment of the method, the network 30 does not release the N1 NAS signalling connection with the UE 10 (405) after sending SERVICE REJECT message 503 with backoff timer to the UE 10. Thus, the UE 10 and network 30 are kept in CONNECTED. The network 30 does not run an access network (AN) release procedure.

The UE 10 may run the backoff timer (404). The UE 10 thus does not make access attempts over N3GPP access 20*b* until the backoff timer expires. If paging or notification 504 arrives at the UE 10 (406) indicating that the network 30 has DL data for the UE 10 over the N3GPP access, the UE 10 stops the backoff timer (407) and responds to the indication from the network 30 over N3GPP access 20*b* (408) to complete the delivery of the DL data 506 over N3GPP access 20*b* (409). The indication of DL data 506 for the N3GPP access 20*b* by the paging or notification can reuse the existing Access Type with value "non-3GPP access" or can use a new value that can be recognized and determined by the UE 10 that the network 30 has DL data for the UE 10 over N3GPP access 20*b*. The UE 10 can respond to the indication 504 by reactivating the N3GPP user plane resources for such data. More specifically, when receiving the indication, the UE 10 performs the service request procedure to get the non-3GPP user plane reactivated by the non-3GPP access 20*b* and the network 30.

Figure 6:
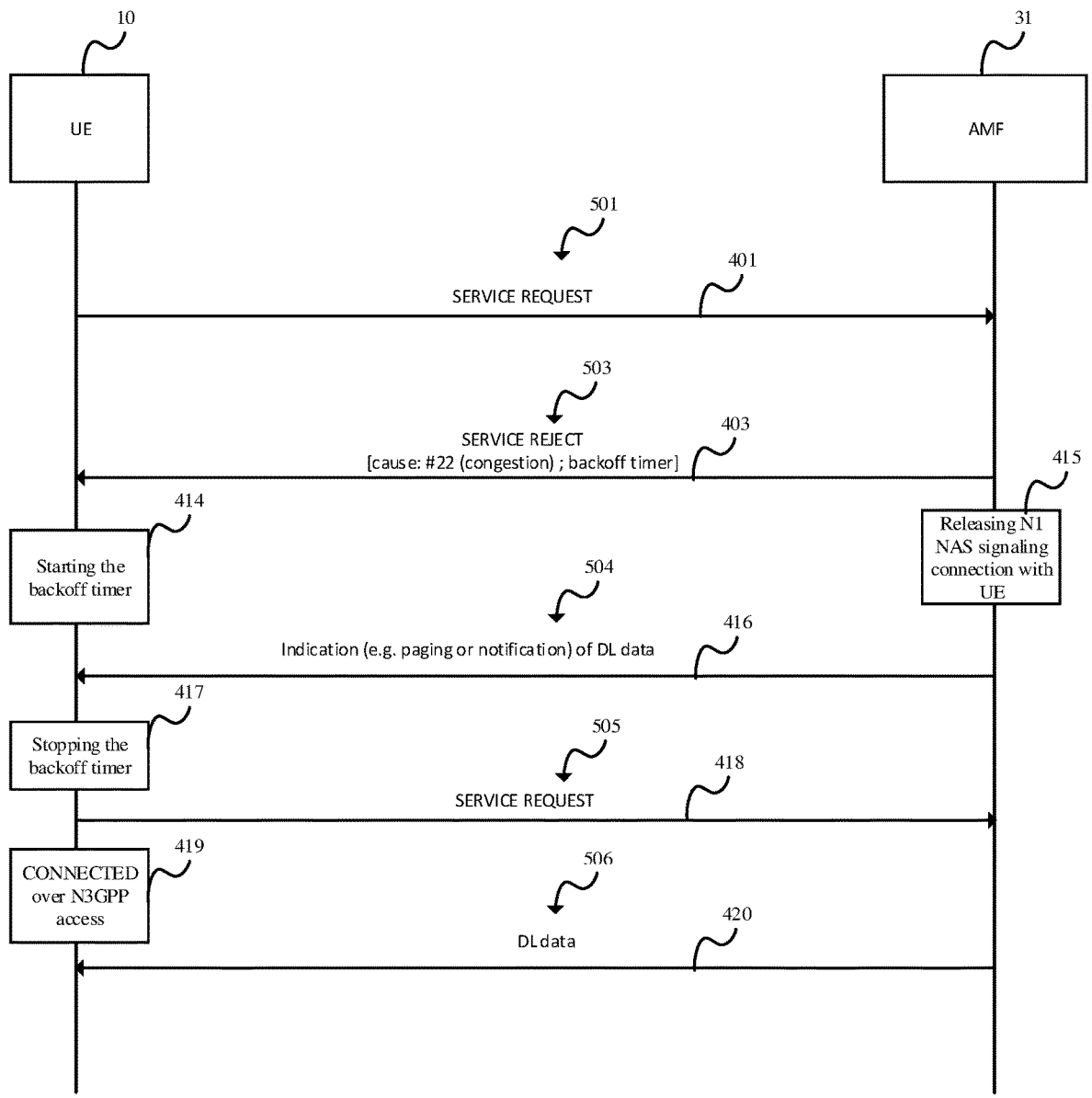
FIG. 6 illustrate a method for allowing a UE to respond cellular network signalling over a non-cellular radio access network according to another embodiment of the present disclosure.

With reference to FIG. 6, in an alternative embodiment of the method, when N1 NAS signalling connection is released (415), the network 30 treats the UE 10 as IDLE, and reflects the IDLE state of the UE 10 in its UE related context of the UE. The UE 10 runs the backoff timer for N3GPP access (414). When the network 30 sends paging or notification 504 to the UE 10 over the 3GPP access 20*a* indicating that the network 30 has DL data for the UE 10 over N3GPP access (416), N3GPP NAS of the UE 10 stops the backoff timer (417), responds to the indication to facilitate delivery of the DL data over N3GPP access 20*b* to the UE 10, and receives the DL data over N3GPP access 20*b*. More specifically, when receiving the indication 504, the UE 10 sends a SERVICE REQUEST 505 to the network 30 to perform the service request procedure (418), and thus to get the non- 3GPP user plane reactivated by the non-3GPP access 20*b* and the network 30. The UE 10 returns to CONNECTED over N3GPP access 20*b* after the service request procedure (419). The network 30 treats the UE 10 as CONNECTED, and reflects the CONNECTED state of the UE 10 in UE related context of the UE 10. The network 30 sends the DL data 506 over N3GPP access 20*b* to the UE 10 (420)

Figure 7:
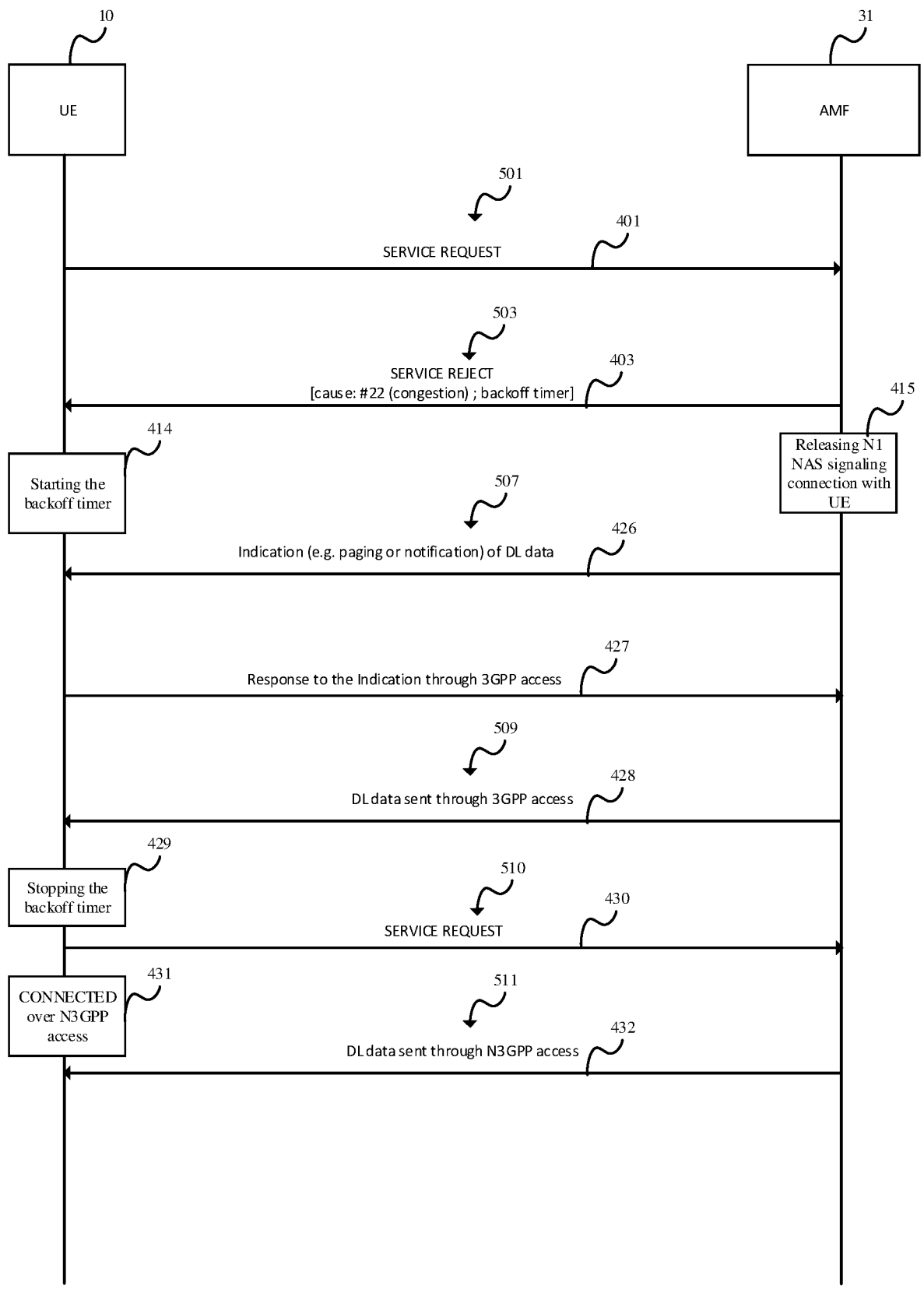
FIG. 7 illustrate a method for allowing a UE to respond cellular network signalling over a non-cellular radio access network according to still another embodiment of the present disclosure.

With reference to FIG. 7, in another alternative embodiment of the method, when N1 NAS signalling connection is released (415), the network 30 treats the UE 10 as IDLE, and reflects the IDLE state of the UE 10 in its UE related context of the UE 10. The UE 10 runs backoff timer for N3GPP access (414). If the network 30 sends paging or notification 507 to the UE 10 over the 3GPP access 20*a* (426) indicating "non-3GPP" while N3GPP access 20*b* represented by the "non-3GPP" is not available to the UE 10, the UE 10 responds to the paging or notification through 3GPP access (427), and the network 30 delivers DL data 509 through 3GPP access (428). The UE 10 stops backoff timer (429), and starts necessary procedure to return to CONNECTED over N3GPP access 20*b*. More specifically, when receiving the indication 507, the UE 10 sends a SERVICE REQUEST 510 to the network 30 to perform the service request procedure (430), and thus to get the non-3GPP user plane reactivated by the non-3GPP access 20*b* and the network 30. The UE 10 returns to CONNECTED over N3GPP access 20*b* after the service request procedure (431). The embodiment of the method enables the UE to be treated by the network 30 as active and connected in N3GPP access 20*b*, in which N3GPP user plane resources are reactivated as available to the UE 10. The network 30 can send further DL data 511 associated with N3GPP access as indicated by an ATSSS rule to the UE 10 through N3GPP access 20*b* associated with the DL data 511 (432).

Figure 8:
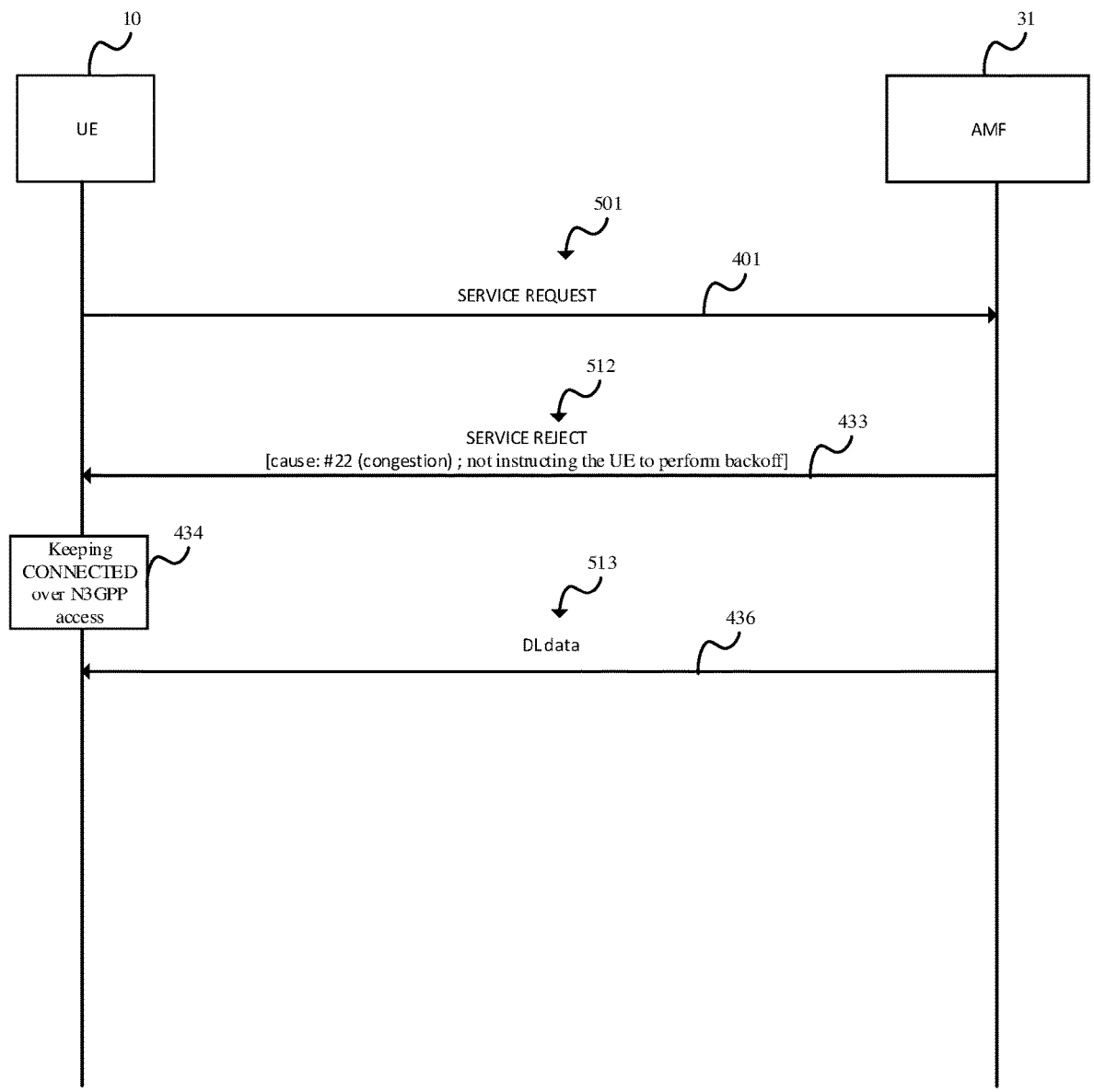
FIG. 8 illustrate a method for allowing a UE to respond cellular network signalling over a non-cellular radio access network according to further another embodiment of the present disclosure.
Figure 9:
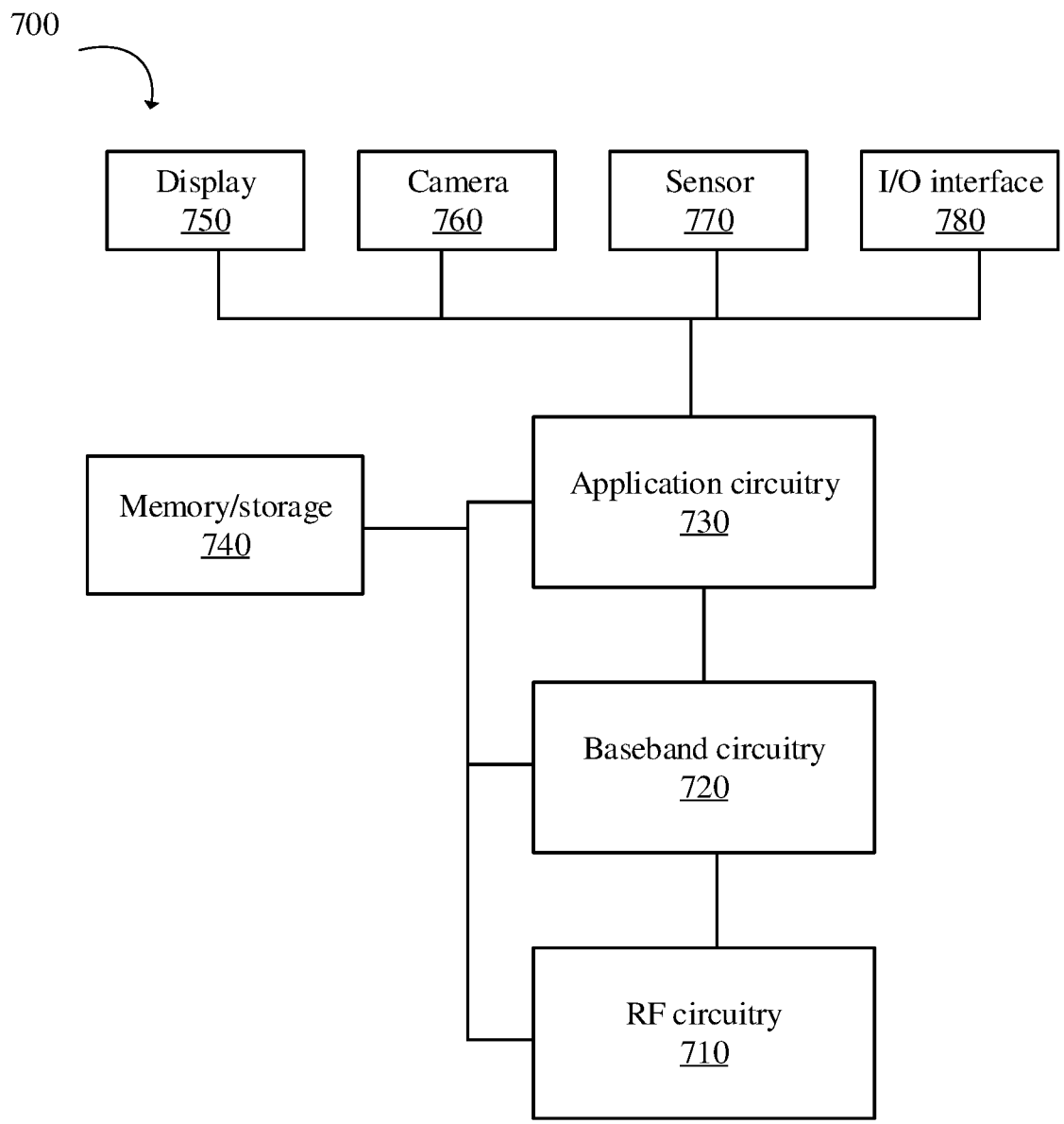
FIG. 9 is a block diagram of a system for wireless communication according to an embodiment of the present disclosure.

With reference to FIG. 8, in still another embodiment of the method, the UE 10 requests for service by sending a SERVICE REQUEST 501 to the network 30 over the N3GPP access 20*b* (401). The network even when unable to grant the request due to network congestion or other reasons, sends a SERVICE REJECT 512 to the UE 10, but does not instruct the UE 10 to perform backoff (433). The UE 10 are thus kept in CONNECTED over N3GPP access (434). That is, the network 30 keeps activation of user plane resources of the N3GPP access 20*b* for downlink data transmission to the UE 10 through a connection of the N3GPP access 20*b*. Any DL data intended by an ATSSS rule to be sent over the N3GPP access will then get delivered over the intended access. More specifically, the network 30 sends the DL data 513 over N3GPP access 20*b* to the UE 10 (436)

Alternative embodiments and variations may be applied to cases where network rejects the UE while allowing delivery of DL data to UE over the access network intended by ATSSS rules, user settings, and/or local UE configurations. Furthermore, the disclosed methods, while being illustrated with MA PDU Sessions and the ATSSS feature, can applied to UE capable of using at least two heterogeneous wireless communication access interfaces, such as telecommunication and wireless LAN interfaces for which data delivery can be governed by other policies and rules other than ATSSS rules.

The disclosed method allows the UE 10 to get data delivered over the access network associated with the data as indicated by an ATSSS rule. When the UE 10 is seen as IDLE over the intended access but can actually get connected over that intended access, the UE 10 makes itself available to the network 30, and the policy rules or user settings or UE local configurations can be followed.

FIG. 11 is a block diagram of an example system 700 for wireless communication according to an embodiment of the present disclosure.

Embodiments described herein may be implemented into the system using any suitably configured hardware and/or software. FIG. 11 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc.

In some embodiments, the baseband circuitry may provide for communication compatible with one or more radio technologies.

For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN).

Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency.

For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium.

In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency.

For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitries, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality.

In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system.

In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display.

In various embodiments, the system 700 may be a mobile computing device such as, but not limited to, a laptop computing device, a tablet computing device, a netbook, an ultrabook, a smartphone, etc.

In various embodiments, system may have more or less components, and/or different architectures. Where appropriate, methods described herein may be implemented as a computer program. The computer program may be stored on a storage medium, such as a non-transitory storage medium.

The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways.

The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments.

Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

The disclosed method provides efficient use of resources, which helps in meeting costs targets, and expected service performance and policies. Especially given that the N3GPP access is the choice of radio access networks to offload data traffic from the cellular network is desired by many PLMN operators. The disclosed method supports to offload traffic through N3GPP access.

While the present disclosure has been described in connection with certain embodiments, it is understood that the present disclosure is not limited to the disclosed embodiments but is intended to cover various arrangements made without departing from the scope of the broadest interpretation of the appended claims.

What is claimed is:

1. A method for allowing a user equipment (UE) to respond cellular network signalling over a non-cellular radio access network, implemented by the UE, comprising:
    receiving, by the UE in an inactive state over a non cellular radio access, an indication through cellular network signalling indicating that a set of downlink data for the non-cellular radio access are available for transmission to the UE, wherein the inactive state of the UE comprises an IDLE non-access stratum (NAS) state;

responding to the indication over the non-cellular radio access by initiating another service request procedure that activates or reactivates the non-cellular radio access; and receiving the set of downlink data through the non-cellular radio access.

2. The method of claim 1, wherein
the cellular network signalling comprises Third Generation Partnership Project (3GPP) network signalling which is sent over a 3GPP access network.

3. The method of claim 2, wherein
the indication comprises a paging message or a notification.

4. The method of claim 3, wherein
the non-cellular radio access connection comprises a non-3GPP radio access connection.

5. The method of claim 2, wherein
the type of radio access is indicated within a paging message or a notification message.

6. The method of claim 1, wherein
the UE enters an active state over the non-cellular radio access upon activation of the non-cellular radio access, wherein the active state of the UE comprises a CONNECTED NAS state.

7. The method of claim 1, wherein
the method further comprises:
activating or reactivating user plane resources of the non-cellular radio access for connection of the non-cellular radio access and the set of downlink data.

8. The method of claim 1, wherein
an N1 NAS signalling connection of the UE is released before the receiving of the indication.

9. The method of claim 1, wherein
before the receiving of the indication, the method further comprises:
initiating a service request procedure over non-cellular radio access for a cellular network service;
receiving a service reject message in response to the service request procedure; and
entering an inactive state of the UE over a non-cellular radio access.

10. The method of claim 9, further comprising:
starting a backoff timer indicated by the service reject message after receiving the service reject message, wherein the backoff timer indicate a duration of time;
refraining from requesting the cellular network service during the duration of time; and
stopping the backoff timer for the non-cellular radio access and performing the initiating of the service request procedure that activates or reactivates the non-cellular radio access in response to receiving of the indication.

11. An apparatus comprising:
a transceiver configured to transmit and receive signalling; and
a processor connected to the transceiver and configured to execute the following steps:
receiving, in an inactive state of the apparatus over a non cellular radio access, an indication through cellular network signalling indicating that a set of downlink data for the non-cellular radio access are available for transmission to the apparatus, wherein the inactive state of the apparatus comprises an IDLE non-access stratum (NAS) state;
responding to the indication over the non-cellular radio access by initiating another service request procedure that activates or reactivates the non-cellular radio access; and
receiving the set of downlink data through the non-cellular radio access.

12. The apparatus of claim 11, wherein
the cellular network signalling comprises Third Generation Partnership Project (3GPP) network signalling which is sent over a 3GPP access network.

13. The apparatus of claim 12, wherein
the indication comprises a paging message or a notification.

14. The apparatus of claim 13, wherein
the non-cellular radio access connection comprises a non-3GPP radio access connection.

15. The apparatus of claim 12, wherein
the type of radio access is indicated within a paging message or a notification message.

16. The apparatus of claim 11, wherein
the apparatus enters an active state over the non-cellular radio access upon activation of the non-cellular radio access, wherein the active state of the apparatus comprises a CONNECTED NAS state.

17. The apparatus of claim 11, wherein
the processor further executes the following step:
reactivating user plane resources of the non-cellular radio access for connection of the non-cellular radio access and the set of downlink data.

18. The apparatus of claim 11, wherein
an N1 NAS signalling connection of the apparatus is released before the receiving of the indication.

19. The apparatus of claim 11, wherein
before the receiving of the indication, the processor further executes the following steps:
initiating a service request procedure over non-cellular radio access for a cellular network service;
receiving a service reject message in response to the service request procedure; and
entering an inactive state of the UE over a non-cellular radio access.

* * * * *